Figure 1:
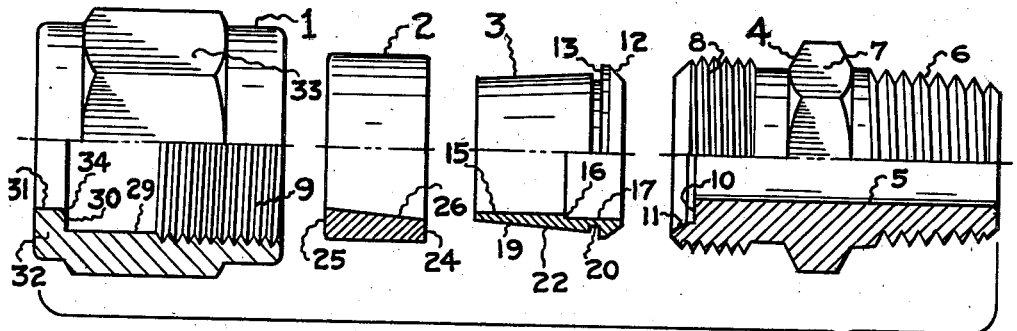

June 2, 1953

A. L. BIGELOW 2,640,716

TUBE COUPLING

Filed Dec. 28, 1948

3 Sheets-Sheet 1

INVENTOR.
ARTHUR L. BIGELOW
BY
ATTORNEYS

June 2, 1953  A. L. BIGELOW  2,640,716
TUBE COUPLING

Filed Dec. 28, 1948  3 Sheets-Sheet 2

INVENTOR.
ARTHUR L. BIGELOW
BY
ATTORNEYS

June 2, 1953  A. L. BIGELOW  2,640,716
TUBE COUPLING

Filed Dec. 28, 1948  3 Sheets-Sheet 3

INVENTOR.
ARTHUR L. BIGELOW
BY
ATTORNEYS

Patented June 2, 1953

2,640,716

UNITED STATES PATENT OFFICE 2,640,716

TUBE COUPLING

Arthur L. Bigelow, Euclid, Ohio

Application December 28, 1948, Serial No. 67,618

8 Claims. (Cl. 285—122)

This invention relates to tube fittings and couplings and more particularly to improvements in the type of tube fittings which avoid preliminary flaring, threading, soldering or otherwise working the tube to be coupled.

Prior practice has been exemplified in the so-called compression ring type of fitting sometimes provided with a cutting edge. Often the compression type fitting has employed a single or double wedge shaped relatively hard metal ring adapted to be jammed into the deep flared mouth of the body of the fitting and constricted into a wedging contact between the fitting body and the wall of the tube to be gripped and sealed therein. Other compression type fittings have employed plastic or elastic rings such as lead or rubber intended to be deformed with a more or less hydrostatic pressure or combined wedge and pressure grip on the tube to be coupled and are subject to cold flow of the compression element and/or loosening under age and vibration. Such type of compression fittings while having a range of usefulness for limited purposes especially in small sizes and for low fluid pressures have been deficient variously under conditions of high fluid pressures, vibration, fluid or mechanical shock or other of the more rigorous and exacting conditions of use. Fittings that function by cutting the wall of the tube obtain mechanical grip on the tube but concomitantly the tube is weakened at the cut where high concentrated unit pressures are developed and variable tube restrictions and latent defects are apt to result. Fittings such as these that require a deep flaring mouth in the body of the fitting correspondingly require the insertion of a substantial length of tube and mechanism into the body of the fitting, handicapping or precluding their use in close quarters.

These and other related types of fittings often subject the tube to be coupled to injury or latent injury when wrench torques of more than controlled limited amounts are employed. Similarly the dependence of these types of fittings on high unit pressures exerted on the tube invites undesirable or hazardous tube restriction, wall kinking, fracture or other susceptibility to failure, not necessarily at the moment of making the joint.

It is among the objects of my invention to solve the problems mentioned and suggested above and to provide a tube fitting that requires no flaring, ribbing, threading or other preliminary working of the tube and which will operate satisfactorily throughout a wide range of tube sizes, materials, working pressures and conditions of vibration and hydraulic and mechanical shock. Another object of my invention is to provide a fitting from which the hazard or injury and latent injury from wrench torque is substantially eliminated, that is to say wherein the hazard of injuring the tube or fitting or impairing the joint by excessive wrench torque is removed. Another object is to provide a fitting of the within type that does not cut the tube nor deleteriously constrict the fluid passage therethrough or reduce the same below allowable limits as an incident to the successful gripping thereof and the successful maintenance of a fluid-tight joint. A further object is to provide a fitting in which the grip upon the tube is largely distributed over a wide bearing area wherewith to preserve the tube and refrain from undue constriction thereof while making it practicable to include within the wide bearing area, limited areas of concentrated pressures to enhance the grip without however deleteriously cutting, fracturing or injuring the tube wall.

Other objects are to provide a coupling that is operable with standard nut wrenches, that is reusable in the sense that the joint may be opened and resealed as often as may be practicably desirable without impairing the seal or the efficiency of the joint.

Another object is to provide a "close" coupling that admits of attachment and detachment with little or no substantial longitudinal movement of the tube to be coupled. A further object is to provide a fitting that is practically spoilproof in the sense of being self-preserving as well as preserving of the tube to be coupled. Another object is to provide a coupling that will accommodate the commercial range of tolerances in tube sizes and provide satisfactory seals and joints throughout such range.

Another object is to provide a fitting adaptable to a wide range of uses and purposes and specifically adapted to employment with different fitting bodies. Another object is to provide a tube fitting fulfilling some or all the above objects that will be economical of time and cost in manufacture and use and uniformly dependable in its intended functions.

Figure 2:
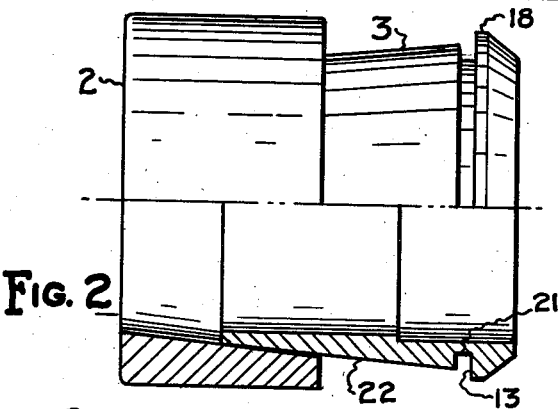
Figure 3:
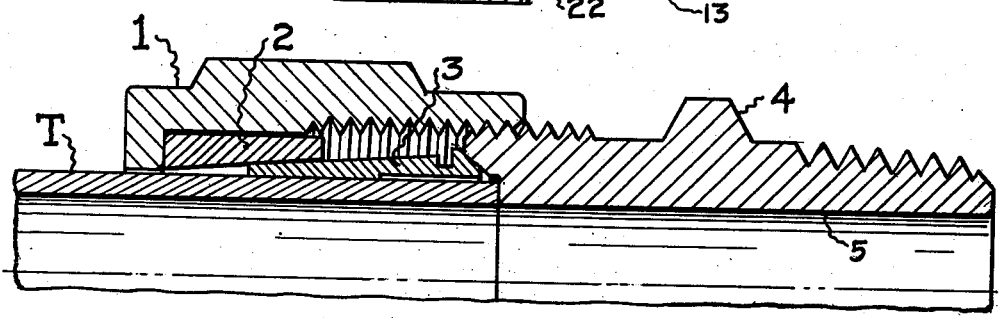
Figure 4:
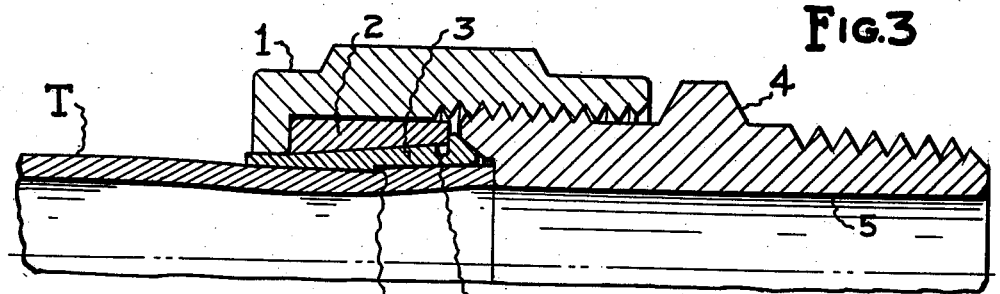
Figure 5:
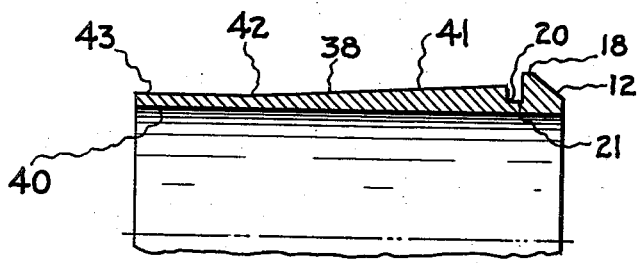
Figure 6:
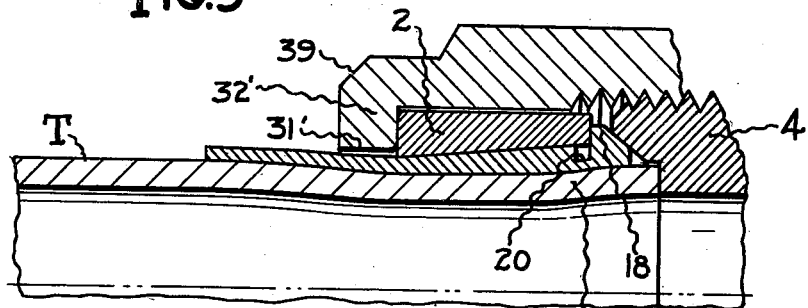
Figure 7:
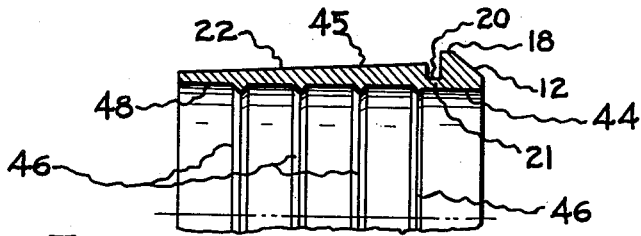
Figure 8:
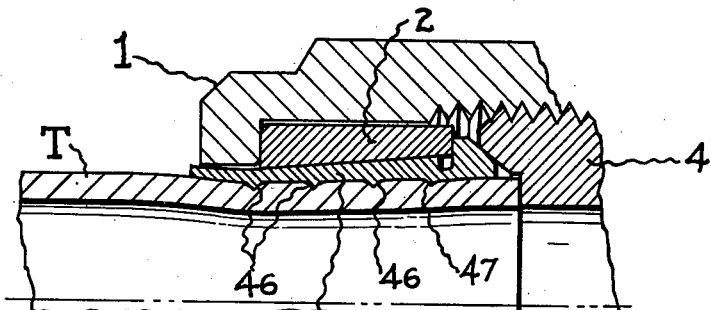
Figure 9:
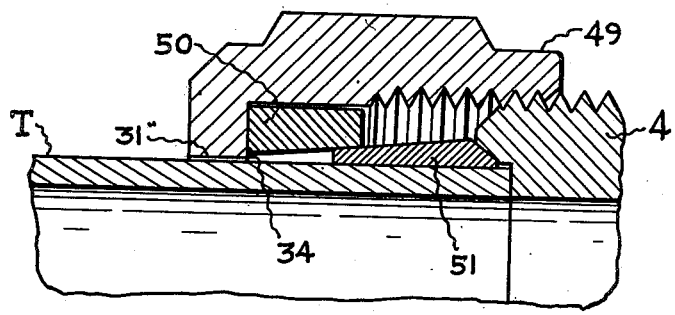
Figure 10:
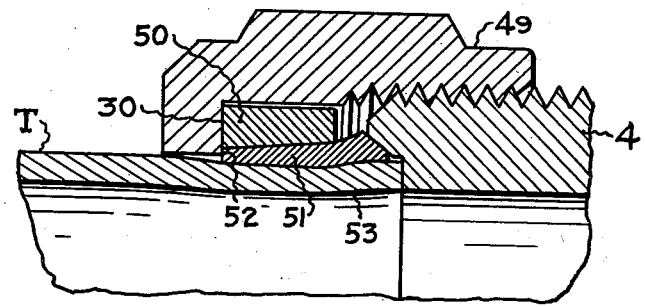
Figure 11:
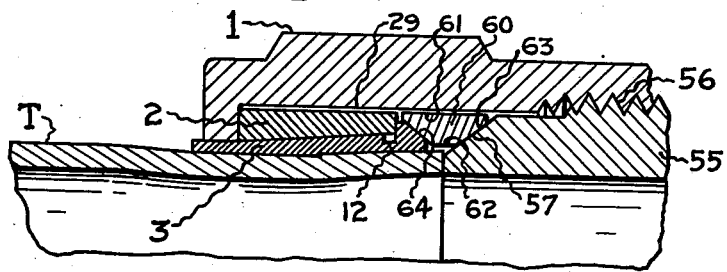
Figure 12:
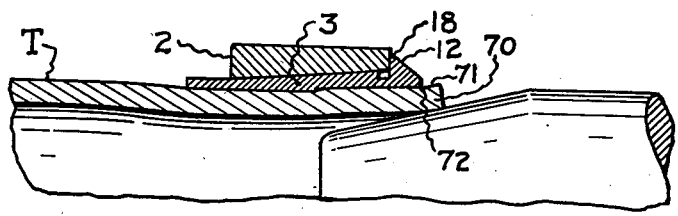

Other objects and advantages of my invention will appear from the following description of a preferred and certain modified form thereof, reference being had to the accompanying drawings in which Figure 1 is a collective view of the several parts of the preferred form of my invention axially aligned, partly in side elevation and partly in longitudinal section; Figure 2 is an enlarged partial longitudinal section and side elevation of a sub-assembly of the ring and sleeve parts of the fitting shown in Figure 1; Figure 3 is a fragmentary longitudinal section of a preliminary assembly of the fitting shown in Figure 1 in relation to the tube to be coupled; Figure 4 is a view similar to Figure 3 showing the parts in the final assembled gripping and sealing relationship; Figure 5 is a fragmentary longitudinal section of a modified form of the sleeve element of my fitting; Figure 6 is a fragmentary longitudinal section similar to Figure 4 showing, however, the modified form of the sleeve element of Figure 5; Figure 7 is a fragmentary longitudinal section of another modified form of the sleeve element of my invention; Figure 8 is a fragmentary longitudinal section similar to Figures 4 and 6 showing, however, the sleeve of Figure 7 therein; Figure 9 is a fragmentary longitudinal section of a preliminary assembly similar to Figure 3 showing another modified form of my invention; Figure 10 is a fragmentary longitudinal section showing the parts of Figure 9 in the position of final assembly gripping the tube to be coupled and sealing the joint; Figure 11 is a fragmentary longitudinal section showing the adaptation of the preferred form of my invention to an S. A. E. or A. N. body with the adapter therefor, and Figure 12 is a fragmentary longitudinal section showing a punch entering and expanding the extreme end of a tube after the sleeve and ring have been constricted upon the tube and bonded thereto.

A preferred form of my invention, shown in Figs. 1–4 inclusive, comprises a nut 1, ring 2, sleeve 3 and body 4, which in their intended coaction and operation receive the tube T, Fig. 3, and grip the same, Fig. 4, to effect a fluid-tight seal and mechanical grip between the tube and coupling. In this form of my invention the internally tapered ring 2 coacts with the externally tapered sleeve 3 whereby the sleeve is constricted diametrically into sealing and gripping engagement with the tube and forced into sealing contact with the body when the ring is forced axially over the bushing under the influence of the nut 1 as the same is advanced on the threads of the body 4. In this form of my invention it will also be noted that the nut, acting axially through the ring, positively constrains the sleeve 3 against axial movement relative to the ring and body and that the nut bottoms through the sleeve relative to the body, see Figure 4, when the joint is completed whereby to eliminate the feel of wrench torque and the variables thereof as a measure of the degree or extent of the sufficiency of the grip and seal of the joint.

In this preferred form of my invention the body 4 has a bore 5 corresponding approximately to (a little smaller according to standard practice than) the internal diameter of the tube T to be coupled coaxially thereof, and the body according to common practice may have external pipe threads 6 for attachment to other instrumentalities. The straight form of the body 4 will be understood to be illustrative of T's, elbows and other well-known body forms. The body also has an external non-circular preferably hexagonal surface 7 to accommodate a wrench according to common practice. Leftwardly, as viewed, of the hexagonal surface 7 the body has external threads 8 which coact with internal threads 9 of the nut 1 to facilitate the forcible relative movements of the parts and the exertion through and upon the ring and sleeve of the forces that accomplish the gripping and sealing functions of the coupling. The leftward, as viewed, end of the body 4 is counterbored at 10 to an external diameter approximating the O. D. of the tube T and outwardly from the counterbore the body is flared at 11 preferably at about 37° to form a seat; the counterbore, see Fig. 3, receiving and centering the end of the tube T and the seat 11 receiving the correspondingly beveled end 12 of the sleeve 3; the surfaces 11 and 12 being smoothly formed and mated so that a fluid tight contact is established therebetween when the sleeve is forcibly urged into the seat 11, Figure 4. Preferably the counterbore 10 is quite shallow in its axial dimension, the depth being not necessarily greater than sufficient to encompass substantially the whole peripheral end of the tube T with allowance for ordinary commercial irregularities in cutting the ends of such tubes. The shallowness of the counterbore gives the coupling its desirable quality of closeness in the sense that the tube T is intended to enter the body 4 a minimum axial distance consistent with the centering thereof plus the axial component of the seat 11, the extent of which preferably does not exceed that requisite to provide a seating surface of such width as will enhance desirable alignment of the sleeve with the body on the one hand and a wedging engagement between the beveled end of the sleeve and the flared seat of the body on the other hand. I desire that the mating surfaces 11 and 12 tend to develop a greater frictional resistance to turning the sleeve relative to the body than the nut 1 tends to impart to the ring 2 and the sleeve while the nut is imposing axial thrust and rotative frictional torque directly on the ring. To this end it is preferable that the outside corner of the end 25 of the ring 2 be broken on a modest radius to reduce the area of contact with the face 30 of the back wall of the nut 1, the corner between the bore 31 and face 30 of the nut being also rounded for the same reason and otherwise as will presently appear. The area of the mating surfaces 11 and 12 is also sought to be great enough to avoid malformation under load and working conditions.

In this preferred form of my invention the sleeve 3 has a bore 15 approximately equal to the O. D. of the tube T; practically, the diameter of the bore 15 exceeding the maximum commercial variation in the specified O. D. of the tube by the least amount that will permit manual insertion of the tube into the sleeve, i. e. a close sliding fit therebetween. For half inch O. D. commercial tubing the bore 15 may measure about .505" and clear and fit the allowable oversize "half inch" tubes while having a desirably close fit with tubes running undersize within commercial tolerances. The bore 15 extends from the far end of the sleeve that is disposed remote from the body preferably a little more than half the overall length of the sleeve about as shown in the drawings and terminates in an abrupt shallow shoulder 16 at the end of the counterbore 17 which extends from the shoulder to the "near" or beveled end of the sleeve. The counterbore 17 may exceed the diameter of the bore 15 by an amount sufficient to give the shoulder 16 the function and effect of an appreciable and abrupt step, the depth of which may well be of the order of about ⅛ the wall thickness of the tube to be coupled depending somewhat on the material of the sleeve and the tube; the function of the step being to enhance the grip of the sleeve on the tube and/or to develop an annulus of concentrated constricting forces between the sleeve and the tube and to cause an abrupt depression in the surface of the tube in the direction to oppose blow out of the tube from the coupling after the parts have been joined. Generally speaking the depth of the shoulder 16 may desirably be rather less than the suggested ⅛ the thickness of the wall to be coupled when the sleeve and the tube are of harder metals and more nearly or exceeding ⅙ the thickness of the tube when the metals are softer, regard also being had for the thickness of the wall of the tube, the size thereof and the conditions of use to be encountered. It will be appreciated that large diameter thin walled soft metal tubes are more apt to rupture at relatively low pressures before being blown out of the joint and conversely that small diameter thick walled hard metal tubes capable of withstanding high internal pressures may well require great resistance in the joint against blow out by virtue of their capacity to withstand high internal pressures. In determining the depth of the shoulder 16 my teaching is to select that minimum depth sufficient to resist blow out of the tube from the joint with regard to the character of the tube to be coupled and the service for which the tube and joint are intended. As a practical matter the depth of the shoulder 16 may be from about ⅛ to ¼ the wall thickness of the tube and preferably, for rule of thumb, about ⅙ the wall thickness of the tube. While I desire that the shoulder 16 intersect with the surface of the bore 15 abruptly I do not desire that the edge so formed be of the character to substantially cut or shear the surface of the tube when the edge is constricted radially to a smaller diameter than the idle outside diameter of the tube. Rather I prefer that the edge merely be sharp or abrupt enough to indent the surface abruptly without substantially cutting the metal in the surface structure. My preference is that the step cause an abrupt indenture of the tube wall at a substantial distance from the end thereof, much as shown in the drawings, so that the radial components of internal pressure that tend to blow the tube out of the fitting are used to expand or tend to expand the tube between the shoulder and the end of the tube into a tighter grip in the sleeve.

Externally the "near" end of the sleeve 3 is squared off for a short distance and is beveled at 12 as above described, the beveled surface lying in an annular head portion 18 which is substantially thicker and more resistant to bodily constriction than the "far" tapered portion 19 of the sleeve that lies beyond an annular narrow groove 20, the bottom of which measures a thin or weakened connection 21 between the head and tapered portions. The groove 20 exposes a square shoulder 13 facing the "far" end of the sleeve and serving as an abutment to limit travel of the ring 2, see Fig. 4; the radial height of the tapered portion of the sleeve on the far side of the groove being substantially less than the height of the shoulder 13. The tapered portion of the sleeve preferably has a true smooth conical exterior surface 22 coaxial with the bore 15 and counterbore 17 having a slope preferably about 2° from the axis and of increasing diameter from the "far" end of the sleeve toward the "near" end thereof. In couplings for tubes of less than about ½" O. D. I prefer that the slope of the taper of the sleeve be, as a general rule, increased to about 3° from the axis. Preferably the thickness of the sleeve at the extreme far end is no more than about ⅓ the thickness of the wall of the tube to be coupled such that in a ½" O. D. aluminum tube of .040" to .060" wall thickness the sleeve would be about .015" to .020" thick at the extreme far end. As a practical matter I prefer to avoid a feather edge at the far end of the sleeve to avoid manufacturing awkwardness. On the other hand it is desirable to have the whole tapered portion of the sleeve of minimum practicable thickness for ease of constriction consistent with strength sufficient to carry its desired axial loads and perform its intended gripping and sealing functions. The length particularly of the tapered portion 19 of the sleeve is essentially such that taken with the angle of the slope of the taper there will be afforded with the desired longitudinal travel of the ring the desired radial constriction of the sleeve and corresponding grip upon the tube. In this respect it may be noted that the travel of the ring is limited by contact with the shoulder 13 of the head 18 and in this form of my invention the ring and sleeve are proportioned to have a snug initial overlapping fit as shown in Figures 2 and 3 preceding the travel of the ring over the sleeve that causes the tube gripping constriction of the latter. Thus for practical purposes in this form of my invention the overall sleeve length includes the head 18, groove 20 and enough length of tapered portion to effect the desired constriction having regard for the differences in the angle of taper of the parts and the desired preliminary initial fit of the parts as shown in Figs. 2 and 3. For examples of specific embodiments of this aspect of my invention I have found it practicable and advantageous to employ a sleeve about ⅜" long for ¼" O. D. tube, about ⅝" long for ⅝" O. D. tube, about ¾" long for 1" O. D. tube, about 1" long for 2" O. D. tube.

I have mentioned that the connector portion 21 at the base of the groove 20 should be of reduced thickness and I find it practicable in a ½" fitting to reduce this thickness down to about .020" where the groove is about 1/32" wide. The connector in this size in relation to the other parts of the sleeve is strong enough to transmit axial thrust between the tapered portion of the sleeve and the head portion thereof sufficiently to effect or initiate the seal between the seating surfaces 11 and 12 of the body and sleeve respectively and to resist substantial axial movement of the tapered portion toward the head and body while the ring is advancing over and constricting the tapered portion. The connector is weakened enough in resistance to bending in the plane of the axis of the sleeve to facilitate constriction of the tapered portion of the sleeve adjacent the groove without disadvantageously tending to tip the head portion out of an advantageous sealing relationship with the body of the connector.

The ring 2 is characterized by its ability to resist expansion or diametrical enlargement while it is performing its function of constricting the sleeve 3. Therefore as suggested in the drawings the ring is of substantially greater wall thickness than the sleeve so that in its travel over the sleeve from about the position shown in Figure 3 to that shown in Figure 4 it tends to hold or substantially hold its idle external diameter. From the point of view of economy of size of the whole coupling I prefer that the ring 2 be supplied with its requisite strength not merely by increasing its wall thickness but also by the choice of material, and working and/or hardening the material to increase its strength in resistance to expansion. The ring 2 in this form of my invention is somewhat shorter than the sleeve 3 and the tapered portion 19 thereof and the ring has its near end 24 and far end 25 square and normal to its axis and has a smooth circular cylindrical exterior and has a smooth internal conical tapered bore 26, expanding from its far to near end, the slope of which is preferably about 3° from its axis. The slope of the surface 26 in this form of my invention is rather steeper than the slope of the tapered portion 19 of the sleeve 3 in the sizes ½" and larger but is approximately the same as the slope of the tapered portion of the sleeve in sizes smaller than ½". In this form of my invention the diameter of the bore 26 at the near end of the ring is slightly larger than the external diameter of the far end of the sleeve so that the ring and sleeve may be preliminarily and/or manually assembled in the relationship shown in Figure 2 with a light pressed fit admitting the far end of the sleeve approximately mid-way into the bore 26 of the ring without substantially constricting the far end of the sleeve but with sufficient stressed engagement between the parts to facilitate their being handled as a unit when assembling the coupling and/or applying the coupling parts to the tube T. The internal diameter of the bore 26 at the far end of the ring is materially smaller than the external diameter of the far end of the sleeve whereby to effect a substantial reduction in the diameter thereof when the parts are being advanced from about the position shown in Figures 2 and 3 to about the position shown in Figure 4. The internal diameter of the near end of the ring 2 may, for example in a ½" coupling, be about .554" and the internal diameter of the far end of the ring may in the same exemplary coupling be about .515" whilst the external diameter of the far end of the sleeve may be about .537" and the external diameter of the tapered portion of the sleeve adjacent the groove 20 may be about .584" in which event the mean diametrical constriction of the sleeve and more particularly the sleeve in about the zone of the shoulder 16 thereof would tend to be about .030". Allowing for average clearance between the inside of the sleeve and the outside of the tube with the variations in commercial tolerances in this respect, which are greater in large tubes than in small, the inside of the sleeve adjacent the shoulder 16 would tend to be moved radially toward the axis of the tube an amount in substantially all sizes of tubes from about ¼" to 2" O. D. that will cause a maximum constriction of the internal diameter of the tube of from about .015" to about .020".

The nut 1 having the internal threads 9 mentioned above also has a smooth interior cylindrical counterbored surface 29 of diameter approximately equal to the minor diameter of the threads 8 and of slightly greater diameter than the diameter of the external surface of the ring 2 whereby to permit free reception of the ring 2 therein as shown in Figure 3 and to have such clearance with respect to the ring as to avoid substantial contact or seizure between the nut and the ring when the ring is under its maximum expanded stress as shown in Figure 4. The "far" end of the counterbore 29 terminates in an annular radially disposed smoothly surfaced shoulder 30 which in turn is delineated by the end bore 31 of the nut that pierces the "far" wall 32 thereof. Externally the nut has a non-circular or hex wrench engaging surface to facilitate its forcible threaded advance over the threads 8 of the body. The bore 31 of the nut in this form of my invention joins the shoulder 30 in a rounded corner 34 and the bore is preferably of a little less diameter than the diameter of the far end of the tapered bore of the ring 2 so that the bore of the nut will have an ironing and constricting contact and engagement with the far end of the sleeve 3 as and prior to the condition shown in Figure 4, whereby to further constrict the far end of the sleeve to further increase the area of grip of the sleeve on the tube and further enhance the capacity of the fitting to resist failure from vibration, and inter alia, to "lock" the parts together and diminish any tendency of the nut to back off the threads of the body under adverse conditions of vibration or other loosening influences. Moreover the grip between the bore of the nut through the sleeve upon the tube is remote from the seat and steadies the tube and sleeve to hold the seating surfaces 11 and 12 in mating engagement with great and desirable mechanical advantage.

In the use and operation of this form of my invention the ring 2 and sleeve 3 are conveniently first assembled as shown in Figure 2 with a light pressed coaxial fit, as mentioned above, so that the two parts may be handled as a unit and then preferably disposed in the nut in approximately the relationship shown in Figure 3. Then if desired the nut may be preliminarily threaded onto the body substantially as shown in Figure 3 without appreciably advancing the ring over the sleeve but bringing the beveled end of the sleeve into light contact with the seat of the body. Thereafter when desired the tube to be coupled may be inserted through the bore 31 of the nut and the bore 15 of the sleeve until the end of the tube enters and bottoms in the counterbore 10 of the body; it being understood, of course, that when desired the nut, ring and sleeve may be detached from the body and sleeved over the end of the tube prior to threading the nut on the body. In all events when the parts are assembled substantially as shown in Figure 3 the nut is then forcibly advanced over the threads of the body with the shoulder 30 of the nut slidably and rotatably bearing upon the end surface 25 of the ring and forcing the ring axially over the sleeve. The axial movement of the ring over the sleeve compels the constriction of the sleeve and the increasing grip of the sleeve upon the tube throughout substantially the whole length of the tapered portion of the sleeve. A double seal is obtained when the nut is tightened onto the body. The tapered sleeve is compressed axially into the body. The ring reduces the sleeve diametrically by wedge forces onto the outer wall of the tube. By these wedge forces the sleeve is virtually bonded into the wall of the tube. This axial force also compresses the angular face of the sleeve into pressure tight contact with the angular recess in the seat of the body. A high pressure tight joint is obtained in direct proportion to the torque forces applied to the nut. Since the sleeve in the first instance has at most but light sliding contact with the external surface of the tube the initial thrust of the nut upon the ring and the sleeve will tend to bottom the beveled end of the sleeve in the seat of the body and thereby limit and negative axial movement of the sleeve under the influence of the ring. In this way I avoid a tendency of the shoulder 16 of the sleeve to tend to cut the wall of the tube by axial movement relative thereto while, however, the shoulder 16 is forced radially inwardly tending to define an abrupt annular ring of constriction on the external surface of the tube as at 36, Figure 4. It will also be noted that when maximum constriction has been obtained as shown in Figure 4 that the outer surface of the tube will also have been firmly and tightly engaged by the inner surface of the counterbore 17 of the sleeve particularly in the axial zone between the shoulder 16 and the groove 20; the connection 21 at the bottom of the groove permitting this portion of the sleeve to be constricted substantially independently of the head 18 whereby the surface of the tube on the side of the shoulder 16 in the direction of the body of the coupling is constrained to follow the face of the shoulder abruptly into the counterbore whereby to have an intimate snugness with the shoulder to more firmly resist an initial increment of the tube movement under blow out pressure.

It will be noted that as shown in Figure 4 axial movement of the ring 2 is limited by direct forcible contact of the forward end 24 thereof with the shoulder 13 of the head of the sleeve 20 with the results mentioned above and with the additional result of finally and directly urging the head portion 18 of the sleeve into final firm seating relation with the seat 11 of the body. The sleeve is therefore held positively against longitudinal movement with respect to the ring even when high pressures are developed or encountered within the tube and the body and thus the tube may not carry the sleeve away from the body as by forcing the sleeve further into the ring and breaking or weakening the seal between the surfaces 11 and 12 of the head of the sleeve and the seat of the body. Thus the positive bottoming of the nut through the sleeve onto and in respect to the body provides a definite stop and not only preserves the joint against leakage but also positively limits relative movement between the ring and sleeve, i. e. limits constriction of the sleeve so that care does not have to be given to limiting wrench torque as a precaution against undesired constriction of the tube or the weakening of the joint in any respect. While destructively excessive wrench torque might strip the threads of the nut and body such damage would be immediately apparent and would of necessity be cured in the first instance, but the great hazard common to tube fittings of the prior art of causing a latent defect in the joint by exerting excessive wrench torque that isn't great enough to cause a patent defect is eliminated in my invention.

While the ring is being advanced over the sleeve in this form of my invention the steeper taper of the ring relative to the sleeve tends to bring about a progressive constriction of the sleeve from the far toward the near end thereof and tends to produce a greater constriction at or toward the far rather than the near end of the sleeve, thereby tending to work the sleeve into the seat of the body and work the end of the tube into the counterbore of the body; the differential taper of the ring and the sleeve also facilitating the axial sliding movement of the ring over the sleeve. It will also be noted as suggested in Figure 4 that while the grip between the sleeve and the tube is extended over a broad area that the constriction of the counterbore 17 of the sleeve is largely confined to that portion between the shoulder 16 and the groove 20 since the head portion 18 of the sleeve while having a constrictive influence exerted upon it in the tapered seat of the body is not substantially constricted onto the tube wherefore the extreme end portion of the tube which lies rightwardly, as viewed in Figure 4, from the plane of the groove 20 is not subjected to substantial constrictive forces which might otherwise tend to close the end of the tube and restrict the passage therethrough without any commensurate gain toward establishing the desired joint and connection. As suggested in Figure 4 the constriction of the inside surface of the tube is small diametrically but great longitudinally, and the constricted surface area blends gently and smoothly with the adjacent unconstricted areas. Since the zone of maximum constriction is at about opposite the shoulder 16 or more remote from the end of the tube than the shoulder 16 so that the inside of the end of the tube has a bell mouth character which tends to make it self-locking in the sleeve as fluid pressure in the tube increases.

After the joint has been made as suggested in Figure 4 and above described the ring, sleeve and tube will in substance and effect have been substantially and permanently integrated or bonded together in fixed engagement and in an immutable relationship so that when the coupling is opened as by backing the nut off the threads of the body and/or backing the nut away from the ring and the sleeve the relationship of the ring, sleeve and tube will not be substantially altered so that the parts may be recoupled and uncoupled many times, reestablishing a strong, leakproof joint as often as may be desired. This is to say, the coupling is eminently reusable and the extent of its use and reuse does not impair its efficiency or utility since it does not depend upon any cutting of the tube or any tendency to fracture the tube or any augmentation of such tendencies as a condition of reusability or reestablishing the desired grip and seal back to its initial and/or maximum state of efficacy.

Preferably the material employed in the several coacting parts of my fitting is the same as the material of the tube to be coupled and/or is of a "friendly" material particularly in the sense of avoiding deleterious electrolitic effects or deleterious corrosive actions between the parts of the fitting or between such parts and the tube. However, in providing fittings for copper tubing I prefer to use a free machining brass sleeve 3 for immediate contact with the tube since such a sleeve reflects more fully the qualities of non-plasticity, resilience and strength than I prefer to have in the sleeve as distinguished from plastic, lead-like or rubber-like characteristics that I believe would develop or appear in sleeves made of copper and used according to the preferred precepts of my invention. I prefer that the sleeve be harder than the outside surface of the tube whereby to impose upon the tube when constrained so to do by the ring. In a fitting for use with copper tubes employing a brass sleeve my preference would be to use a tough bronze for the ring 2 such as Duronze although I have found it practicable to use a cadmium plated heat treated steel ring having tensile strength running up to about 150,000 pounds per square inch; the cadmium plating facilitating the slip of the ring over the sleeve, the slip between the nut and the ring and facilitating the "friendliness" of the different materials satisfactorily. In such a fitting for copper tube the nut and body might well be made of free machining brass. For coupling aluminum tubing I prefer that the sleeve be formed of material approximately the same as, though preferably harder than, the tube to be coupled but that the ring be made of high tensile strength Dural, the nut and body preferably also being made of aluminum and the several parts anodized for the known purposes and advantages thereof. Again in aluminum fittings the ring may be made of high tensile strength cadmium plated steel for the purposes mentioned above. In providing fittings for steel tubing or stainless steel tubing I prefer that the several parts of the fitting be made of steel and that generally speaking the sleeve may be made of material substantially the same as, though preferably harder than, the tube to be coupled whilst the ring is preferably of high tensile strength steel or of steel appropriately heat treated to enhance its tensile strength. Again the steel ring may be cadmium plated and in this instance more particularly for the lubricating value of the cadmium to facilitate the progress of the ring over the sleeve and to reduce the transmission of torque from the nut to the sleeve and the tube. It will be appreciated that a relatively high coefficient of friction is advantageous between the sleeve and the tube and a relatively low coefficient is desirable between the ring and the sleeve and the ring and the nut.

Fittings made and used in accordance with the precepts of the preferred form of my invention are especially free from failure under conditions of vibration because as I am presently advised the wide area of engagement between the sleeve and the tube avoids the concentration of gripping forces at isolated points or places that tend to induce fracture or failure under adverse conditions of vibration. More particularly while in the preferred form of my fitting there is effected a concentration of grip at the shoulder 16, the tube immediately at the shoulder is not gripped substantially tighter than the considerable length of the tube that is firmly gripped throughout the bore 15 and elsewhere adjacent the shoulder, all of which by virtue of the area thereof is characterized by a low unit pressure of grip as compared with the prior art practice where the so-called compression rings or cutting rings develop higher and localized unit pressures and sharper pressure gradients between adjacent parts of the tube.

Tests which have been performed on my fittings and couplings have demonstrated that they are leakproof and blow out proof up to pressures safely in excess of modern commercial and military requirements and are especially efficacious under conditions of vibration and other arduous service conditions.

In Figures 5 and 6, I have illustrated a form of my invention modified in respect to the form of the sleeve member 38 and the nut 39; the other parts corresponding to those above described in the preferred form and identified by the same reference characters, and all the parts preferably following my preferred form in respect to the materials employed. In this form of my invention the sleeve 38 has a plain cylindrical bore 40 corresponding in diameter to the bore 15 of the sleeve 3 but extending the full length of the sleeve eliminating the step 16. While the bore 40 may be formed or machined quite smoothly if desired it may also, depending for example upon the service to which the fitting is intended to be put and upon the materials of the sleeve and the tube, have the surface of the bore 40 roughened considerably as by annular tool marks. The sleeve 38 may have the same head portion 18, groove 20, connection 21 and the same beveled seating surface 12 as above described all doing substantially the same work in substantially the same way. The sleeve 38 preferably has an external tapered surface portion 41 extending from the groove 20 toward the extreme far end thereof, but in this form of my invention I prefer that the conical surface stop at about the point 42 which preferably is spaced from the extreme far end of the sleeve a considerable distance which for example may be considerably greater than the thickness of the back wall 32' of the nut 39 so that when the parts are assembled and the joint is made as suggested in Figure 6 the far end portion 43 will lie largely outwardly beyond the back end of the nut. In this form of my invention I prefer that the end portion 43 have a cylindrical external surface, the thickness of which may, if desired, be approximately the same as the thickness of the far end of the sleeve 3 more or less as may be practicable for manufacturing purposes, that is to say of the order of .015" to .020" for medium sized fittings. In this form of my invention the bore 31' is preferably a little larger or at least no smaller than the minimum internal diameter of the ring 2 at the far end thereof so that when the parts are assembled as shown in Figure 6 the bore of the nut will have or will not necessarily have a tight or snug contact with the part of the sleeve that protrudes therethrough. The sleeve 38 preferably has about the same length between the point 42 and the groove 20 as the whole length of the sleeve 3 with the result that the portion 43 comprises an extension in terms of the length in comparison with the sleeve 3. In operation the constriction of the sleeve 38 is effected by the advance of the ring 2 thereover substantially as above described and the gripping and sealing of the parts is accomplished in substantially the same way with the difference however that the part 43 is first constricted down to a snug, preferably constricting, fit with the outside surface of the tube T and then as the ring continues to be advanced and the tapered portion of the sleeve between the point 42 and the groove is constricted the portion 43 tends to be necked in increasingly from the extreme far end to about the point 42 with the result that the unit pressure between the different longitudinal increments of the portion 43 runs from a minimum at the extreme far end of the sleeve to a maximum adjacent the point 42; the pressure at the extreme end preferably being small and/or not substantially greater than a good close fit. By this progressive grip particularly throughout the portion 43 I find that the capacity of the fitting in its resistance to failure under the influences of vibration or more particularly the capacity of the fitting to enhance the life of the tube under certain conditions of vibration is much enhanced since the sleeve and particularly the portion 43 thereof tends to serve as a vibration dampener and also tends to further increase the area of the grip between the sleeve and the tube and tends to taper off the degree of grip, eliminating or reducing in the sense of susceptibility to failure under vibration any sharply defined point or line where stresses tend to concentrate and fatigue the tube or sleeve or other parts of the fitting or joint. It will be appreciated that while I have described this modified form of sleeve as lacking the shoulder 16 of the sleeve 3 that the sleeve may incorporate the shoulder 16 while retaining the other features mentioned or may incorporate other internal forms to enhance the mechanical grip between the sleeve and the tube such as the form about to be described in Figures 7 and 8 below.

In Figures 7 and 8 all the parts except the sleeve 45 may be taken as corresponding to the parts comprising the preferred form of my invention and are identified with like reference characters. The sleeve 45 in this form of my invention may have the same external configuration with the same conically tapered external surface 22 or substantially the same dimensions and the same or substantially the same coaction with the ring 2 as that above described and have the same or substantially the same groove 20, connection 21, head 18 and beveled seating surface 12. This modified form of sleeve differs from the sleeve 3 in its interior surface and construction, being characterized by having a plurality of inwardly facing V-shaped annular ribs 46 and 47 which, as suggested in Figure 8, are designed to indent the external surface of the tube T when the sleeve is constricted thereupon under the influence of the ring 2. I prefer that the ribs while having fairly sharp inwardly facing edges have their inclined walls diverging at about 90° whereby to be sturdy and self-supporting tending to indent the surface of the tube substantially without substantially cutting the tube surface or inviting fracture at the lines or zones of indentation. Preferably the ribs 46 may stand in from the cylindrical bore 48 about .010" in a 1" fitting, somewhat more in larger fittings and somewhat less in smaller fittings regard being had for material and wall thickness of the tube to be coupled and the service to be performed by the fitting. In this form of my invention I prefer that the rib 47 be disposed at the junction of the bore 48 and the somewhat smaller bore 44 at the "near" end of the sleeve adjacent the head 18, the inner edge of the rib 47 standing inwardly about the same distance from the bore 48 as the inner edges of the ribs 46 wherefore the inner edges of the several ribs lies in approximately the same cylindrical plane, the diameter of which is approximately the same as the diameter of the bore 15 of the sleeve 3 to just clear the external surface of the tube T of maximum diameter within commercial tolerances. The sleeve 45 will therefore tend to have its internal surface 44 approximately the same diameter as the counterbore 17 of the sleeve 3 but the bore 48 will tend to be larger than the bore 15 of the sleeve 3 by approximately the height of the ribs 46 wherefore the wall of the sleeve rearwardly of the rib 47 will preferably be thinner than the corresponding portion of the wall of the sleeve 3, assuming the outer tapered surface is identical with that of the sleeve 3 wherefore this modified form of the sleeve 45 will be a little more easy to constrict under the influence of the ring 2 and will require less wrench torque to accomplish the grip and seal of the parts; the grip being enhanced and brought up to a value equal if not greater than the grip accomplished by the stepped construction of the sleeve 3 with the additional advantage that the sleeve 45 for at least an equal grip upon the tube T will tend to reduce the inside diameter of the tube less than the tendency resulting from the stepped sleeve 3; the ribs 46 and 47 tending to spread the metal of the tube where they form their annular indentures therein with less gross constriction of the tube. In this modified form of my invention the same kind of materials may be employed as mentioned in describing the preferred form of my invention.

In the modified form of my invention shown in Figures 9 and 10, the tube T and body 4 may be taken as identical with those above described; the nut 49 corresponding to the nut 1 of my preferred form but being somewhat shorter and having the bore 31" in its rear wall of but slightly greater diameter than the O. D. of the tube to have a close to free sliding fit therewith and having little or no rounding at 34' at the near end of the bore. Here the ring 50 and sleeve 51 are also shorter than those described in my preferred form but have the same general coaction on similar coacting tapered surfaces as above described. The selection of materials in this form of my invention may be the same or similar to those mentioned above. In this form of my invention the bore of the sleeve may be plain cylindrical or may have any of the interior configurations mentioned above and the external surface is conical at the 2° or 3° slope throughout except for the beveled end 12 corresponding to the same part in the preferred form. The far end of the sleeve 51 however is appreciably thicker than the far end of the sleeve 2 and the internal diameter of the far end of the ring 50 is appreciably greater than the diameter of the bore 31" of the nut so that the shoulder 30 of the back wall of the nut adjacent the bore 31" engages the far end of the sleeve as at 52 when the ring 50 has been forced over the sleeve 51 from the position shown in Figure 9 to that of Figure 10. While this form of my invention affords extra economy of manufacture and material and lends itself especially to applications such as plumbing at city water pressures, it illustrates more particularly however the principle of direct contact between the nut and sleeve for giving the sleeve its final positive axial thrust into the seat of the body and positively limiting the relative movement of the ring with respect to the sleeve at the completion of the joint and also under the influence of blow out pressure and other conditions of use. In this form of my invention it will be noted that the ring is somewhat shorter than the sleeve so that the nut will bottom by direct contact with the sleeve before the ring contacts the body to facilitate the mode of operation and result above described. As shown in Figure 10 the near end of the ring is spaced appreciably from the end of the body when the joint is completed so that the tube does not tend to be constricted by the action of the ring over the sleeve more near the body than about the point 53, i. e., at about the plane of the near end of the ring leaving as in the other forms of my invention the end of the tube as viewed from the body flaring outwardly and tending to be self-locking under the influence of blow out pressures. In this form of my invention the near end of the sleeve while lacking the weakened connector portion 21 to separate the influence of the constrictive forces of the ring from the axial forces tending to seat the beveled end of the sleeve in the seat of the body, does accomplish a satisfactory seating by virtue, as I believe, of the limited length of the ring and the final positive engagement between the nut and the sleeve. At the same time the axial thrust on the sleeve does effect a moderate constrictive influence on the near end thereof in the seat of the body sufficient to form a satisfactory fluid seal against the influence, if any, of the ring to tip the sealing surface of the sleeve while the parts are being forcibly assembled. In this form of my invention I prefer that the ring and sleeve be proportioned to have a preliminary lightly pressed coaxial fit as shown in Figure 9; the sleeve preferably entering the ring a somewhat shorter distance than in the other forms of my invention and the junction of the near wall of the ring and the tapered bore thereof preferably being rounded a little more fully in this form of my invention to facilitate the sliding movement of the ring over the sleeve especially when the angle of taper of the conical surfaces of the ring and the sleeve are approximately the same.

The form of my invention shown in Figure 11 illustrates wherein the nut, ring and sleeve parts may be adapted for connection with a body 55 of the so-called S. A. E. or A. N. type as distinguished from the body 4 previously described. While this adaptation may also be utilized with other forms of my invention, for the sake of illustration I shall describe it only with my preferred form; the nut 1, ring 2, sleeve 3 and tube T all doing the same or substantially the same work in the same or substantially the same way as first above described.

It is characteristic of the S. A. E. or A. N. type of body 55 to have external threads 56 and a beveled end or nose 57 which particularly in the A. N. form is conical, sloping at 37°, throughout substantially the whole of the extreme end of the body except for a small blunted portion 58. In the ordinary use of these bodies the surface 57 affords a seat for the flared end of the tube to be coupled. To adapt my invention for coaction with such a body and to avoid the flaring of the tube and retain the advantages of my invention I provide an adapter ring 60 having a smooth cylindrical exterior 61 of diameter slightly less than the smooth counterbored surface 29 of the nut and having a smooth cylindrical coaxial interior surface 62, the diameter of which is but slightly greater at the exterior diameter of the tube T and corresponds substantially to the diameter of the counterbore 10 of the body 4. The near end surface 63 of the ring 60 is formed conically at an angle corresponding to the angle of pitch or taper of the surface 57 and adapted to mate and seal therewith when forcibly urged thereupon and the far end surface 64 of the ring 60 is conical and coaxial of the other surfaces of the ring and pitched or tapered to correspond to the angle of the seating surface 12 of the sleeve 3 and adapted to mate and seal therewith when the parts are assembled and the joint is formed as shown in Figure 11. I prefer that the surfaces 63 and 64 be identical particularly as to the angle of pitch thereof so that the ring 60 cannot be introduced into the fitting in a "wrong" relation to the respective seating surfaces 12 and 57 and where the pitch of the surface 57 is at 37° as in the A. N. bodies this identity is easily facilitated with the same and opposite pitch that I prefer to employ on the seating surface 12 of the sleeve 3. It is, of course, not impracticable to give the surfaces 63 and 64 different angles to correspond respectively with the surfaces 12 and 57 where the same are different nor is it impracticable to modify the pitch of the surface 12 of the sleeve 3 to correspond to the pitch of the surface 57 where it is thought more desirable to have the pitch of the surfaces 63 and 64 identical than to have those surfaces correspond to different angles of the surfaces 12 and 57 where and if such differences might exist. In operation the ring 60 will be subjected to expanding forces as the sleeve 3 and body 55 are urged toward each other as the nut is forcibly advanced over the threads of the body and therefore the ring is given that desirable measure of tensile strength and resistance to expansion to prevent its being expanded into forcible contact or seizure with the counterbore 29 of the nut by its relatively large cross sectional area and by such heat treatment or hardening as may be found to be desirable or expedient to perform its function. Particularly where the angles of slope of the surfaces 12 and 57 are steep as at about 37° the expansive forces acting upon the ring 60 will necessarily be very considerably less than those acting upon the ring 2 and particularly where the ring 60 is as long as shown in Figure 11 to receive the end of the tube in about the same way that the tube is received in the counterbore 10 of the body 4 I find it practicable to form the ring 60 of the same material as the sleeve 3, and when desired the ring 60 and the sleeve 3 may be made integral or formed in one piece with the advantage of eliminating the joint between the surfaces 12 and 64 and without substantially altering the operation and results of this form of my invention. The operation and results in this form of my invention correspond to those first above described regard being had for the dual seal of the adapter ring on the sleeve and body respectively; the advantages of closeness and reusability, among others, all being preserved, and in point of closeness the use of the adapter facilitates absolute closeness, that is, the tube does not enter the body at all and the nut, ring, sleeve and adapter can all be slipped over the tube before the tube is brought to proximity with the body.

Where in or in the use of any of the forms of my invention hereinabove illustrated and described extremely high blow-out pressures are to be encountered or where for any reason extra mechanical strength is sought in the joint, it is practicable to give my fittings additional strength and resistance to blow-out pressure by the practice illustrated in Figure 12, reference for the sake of illustration being made particularly to the preferred form of my invention. This practice entails a first assembly and completion of the coupled joint as shown in Figs. 4, 6, 8, 10 or 11 and then a disassembly of the nut and body as described in connection with the reusability of my fittings; the tube with the ring and sleeve bonded thereto being removed as a unit from the body and the nut being removable from the vicinity of the ring and sleeve. When the tube T, ring 2 and sleeve 3, as shown in Figure 12, in their "integrated" or bonded relation have been removed from the embrace of the nut and body there will be exposed the short unconstricted extreme end portion 70 of the tube protruding beyond the near end of the sleeve 3 and particularly beyond the squared extreme near end 71, which if peened or expanded outwardly can be substantially "riveted" to the end of the sleeve. To this end I prefer to employ a tapered punch P, preferably having a smooth exterior conical surface pitched at about 15° from its longitudinal axis and proportioned to partially enter the end of the tube with the ring and sleeve bonded thereon, as shown. Then while the latter are held against longitudinal movement, as by a manual grip, the punch is tapped sharply and sufficiently to expand the extreme end 70 of the tube and give it a permanent outward bend and angled set as shown in Figure 12. The sharp forcible entry of the tapered punch into the extreme end of the tube bends the extreme end portion 70 outwardly, fulcruming the portion 70 about the sharp or abrupt inner corner of the end 71 of the sleeve and counterbore 17 thereof, causing that corner of the sleeve to "bite" the tube at the fulcrum point 72. Although the outward bending of the extreme end 70 of the tube be relatively small, as at about 15° from its axis, the effect is much the same as the expansion of a hollow rivet in locking the parts against separation. The extreme end portion 70 is of short length as above described, preferably about half the wall thickness of the tube, so that in its expanded condition it may reenter the counterbore 10 of the body without being constricted back from its angled condition, or for this practice the counterbore 10 may be suitably enlarged to clear the expanded end of the tube if that be found necessary.

After the extreme end 70 has been angled out by the punch P, the punch is withdrawn and the parts re-assembled as shown in Figs. 4, 6, etc., and upon re-assembly the tubes and fitting have a desirable additional resistance against blow-out pressure without sacrifice of the other advantages hereinabove described.

While I have illustrated and described a preferred and certain modified forms of my invention, changes, modifications and improvements therein will occur to those skilled in the art who practice my invention and/or come to understand the fundamental principles and accomplishments thereof wherefore I do not care to be limited in the scope of my patent to the forms and embodiments of my invention herein specifically illustrated and described nor in any manner other than by the state of the prior art.

I claim:

1. In a tube coupling the combination of a tube encompassing sleeve member having an elongated constrictable portion with an externally tapered surface and being adapted to be constricted upon the tube to be coupled, an internally tapered substantially non-expansible ring member axially movable over said portion to constrict the same, a body having a seat juxtaposed to the near end of said sleeve member, said sleeve member having a short substantially rigid annular portion at said end with a seat juxtaposed to the seat of said body and with a shoulder facing oppositely of said seat, said sleeve member also having a radially flexible portion spacing and joining said rigid and constrictable portions, a nut threadably engaging said body and having a bore through which the tube extends and having an internal shoulder engaging the end of said ring member remote from said body and adapted to advance said ring member toward said body over said constrictable portion of said sleeve to constrict the latter, the bore of said nut being adjacent said shoulder thereof and being of diameter slightly smaller than the least internal diameter of said ring, said ring member having a steeper taper than said constrictable portion and having a mean internal diameter not substantially greater than the mean external diameter of said constrictable portion, said ring member when advanced by said nut progressively constricting said constrictable portion throughout the length thereof with maximum constriction near the end of said ring member remote from said body, said flexible portion yielding radially in response to constriction of said constrictable portion, said ring member bottoming longitudinally against said shoulder of said rigid portion, said rigid portion being movable radially relative to said body and to said constrictable portion to facilitate mating engagement of said seats, said sleeve member extending into and being constricted within said bore of said nut as well as within said ring after said ring has first constricted said sleeve member.

2. In a tube coupling the combination of a tube encompassing sleeve member having an elongated constrictable portion with an externally tapered surface and being adapted to be constricted upon the tube to be coupled, an internally tapered substantially non-expansible ring member axially movable over said portion to constrict the same, a body having a seat juxtaposed to the near end of said sleeve member, said sleeve member having a short substantially rigid annular portion at said end with a seat juxtaposed to the seat of said body and with a shoulder facing oppositely of said seat, said sleeve member also having a radially flexible portion spacing and joining said rigid and constrictable portions, a nut threadably engaging said body and having a bore through which the tube extends and having an internal shoulder engaging the end of said ring member remote from said body and adapted to advance said ring member toward said body over said constrictable portion of said sleeve to constrict the latter, said ring member having a steeper taper than said constrictable portion and having a mean internal diameter not substantially greater than the mean external diameter of said constrictable portion, the length of the constrictable tapered portion of said sleeve equaling from about one-half to a full diameter of the tube and being constricted into tight engagement with the tube throughout substantially all of its length, the mean thickness of the tapered portion of said sleeve being substantially less than the thickness of the wall of the tube, said ring member when advanced by said nut progressively constricting said constrictable portion throughout the length thereof with maximum constriction near the end of said ring member remote from said body, said tapered portion of said sleeve in its constriction upon the tube reducing the internal diameter of the tube by an amount not substantially exceeding one-half the wall thickness of the tube, said flexible portion yielding radially in response to constriction of said constrictable portion, said ring member bottoming longitudinally against the said shoulder of said rigid portion, and said rigid portion being movable radially relative to said body and to said constrictable portion to facilitate mating engagement of said seats.

3. The fitting of claim 2 in which the tapered portion of said sleeve has at least one internal annular edge axially spaced from said flexible portion in a direction toward the far end of said sleeve disposed to indent the external surface of the tube when the sleeve is constricted on the tube.

4. In a tube coupling the combination of a tube gripping sleeve member having an annular elongated constrictable portion of less mean wall thickness than the wall thickness of the tube and with an externally tapered conical surface pitched at about 3° and said portion being adapted to be constricted upon the tube to be coupled, a substantially non-expansible ring member axially movable over said portion to constrict the same and having an internally tapered conical surface pitched more steeply than said external surface but not more than about 4½° with a mean internal diameter smaller than the mean external diameter of said external surface and with maximum and minimum internal diameters respectively smaller than the maximum and minimum external diameters of said portion whereby to have constricted the whole length of said portion when moved axially thereover to the point where the surfaces of maximum diameters coincide and to have constricted the thinner parts of said portion more than the thicker parts thereof, a body having a tapered internal seat juxtaposed to the end of said sleeve member adjacent the larger part of said portion, said sleeve member having a tapered external seat at said end juxtaposed to the seat of said body, a nut threadably engaging said body and having a wall with a bore through which the tube extends and with an internal shoulder engaging the end of said ring member remote from said body and adapted to advance said ring member toward said body over said constrictable portion of said sleeve to constrict the latter, said ring member not exceeding the length of the said constrictable portion of said sleeve and the said wall of said nut forcibly engaging said portion when said ring member has been moved thereover to said point.

5. In a tube coupling for connecting a tube to the rearward end of a body, the combination of an annular sleeve having an elongated constrictable portion closely encompassing the tube near the body, said sleeve having a short annular head portion at its forward end of greater radial thickness than the forward end of said constrictable portion and said sleeve having a deep, narrow, annular external groove between said head portion and the forward end of said constrictable portion and a thin, flexible inwardly disposed longitudinally extending connection portion at the bottom of the groove joining said head portion and said constrictable portion, said head portion having a forward face engaging said body means and a rearward shoulder rising above said groove, said body having means at its rearward end against which the tube and sleeve abut and are held against forward axial motion, said elongated constrictable portion having an external conical surface pitched at a small angle to the axis of said sleeve and of minimum external diameter remote from said body, a substantially non-expansible ring member initially encompassing said sleeve remote from said body and adapted to forcibly work and encompass said portion of said sleeve and having an internal conical surface pitched in the same direction as said external conical surface and at a greater angle to the axis of ring member than said small angle, the maximum internal diameter of said internal surface being less than the initial maximum external diameter of said external surface by an appreciable amount and the minimum internal diameter of said internal surface being less than the initial minimum external diameter of said external surface by substantially more than said appreciable amount, and means for forcibly advancing said ring member forwardly toward said body over said portion of said sleeve and working said portion progressively from the rearward to the forward part thereof into progressively tighter constriction upon the tube from the end of said portion near said body to the end of said portion remote from said body, said ring member being forcibly advanced by said means to proximity with said body means, the forward end of said ring member forcibly and finally engaging said rearward shoulder of said sleeve with said internal surface engaging said portion and constricting said portion throughout its entire length, said portion constricting the tube throughout the entire length of said portion and said tube being firmly gripped near the forward end of said ring and constricted increasingly rearwardly to the rearward end of said ring, said connection portion of said sleeve being flexed when said head portion and constrictable portion thereof are moved differently by said ring member, said forward face of said head portion being conical and steeply pitched and sloping inwardly and forwardly, said body means having a complementary face inducing limited constriction of said head portion upon the tube of lesser amount than the constriction of said constrictable sleeve portion and said sleeve portion also comprising a rearward extension of external diameter not exceeding the minimum external diameter of said external conical surface of said constrictable portion, and said extension being constrictable by said ring member and said means for moving the ring member to snug engagement with the tube but in lesser degree than the constriction of said constrictable portion on the tube.

6. In a tube coupling the combination of a tube gripping sleeve member having an annular elongated constrictable portion with an externally tapered conical surface, said portion being adapted to be constricted upon the tube to be coupled, a substantially non-expansible ring member axially movable over said portion to constrict the same and having an internally tapered conical surface pitched more steeply than said external surface with a mean internal diameter smaller than the mean external diameter of said external surface and with maximum and minimum internal diameters respectively smaller than the maximum and minimum external diameters of said portion whereby to have constricted the whole length of said portion when moved axially thereover to the point where the surfaces of maximum diameters coincide and to have constricted the thinner parts of said portion more than the thicker parts thereof, a body having a tapered internal seat juxtaposed to the end of said sleeve member adjacent the larger part of said portion, said sleeve member having a tapered external seat at said end juxtaposed to the seat of said body, a nut threadably engaging said body and having a wall with a bore through which the tube extends and with an internal shoulder engaging the end of said ring member remote from said body and adapted to advance said ring member toward said body over said constrictable portion of said sleeve to constrict the latter, said wall of said nut forcibly engaging said constrictable portion of said sleeve when said ring member has been moved thereover to said point.

7. In a tube coupling the combination of a solid continuous tube-encompassing sleeve member having an elongated constrictable portion with an external surface uniformly tapered throughout the entire length of said portion and being adapted to be constricted upon the tube to be coupled, a substantially nonexpansible ring member uniformly tapered internally throughout its entire length and axially movable over said portion to constrict the same, a body having a tube receiving counterbore with an outwardly flaring mouth defining a conical steeply pitched seat juxtaposed to the near end of said sleeve member, said sleeve member having a short substantially rigid annular portion at said near end with a complementary seat juxtaposed to the seat of said body and with a shoulder facing oppositely of said seat, said tube and said sleeve member initially bottoming against the bottom of the counterbore and the seat, respectively, of said body prior to constriction of said constrictable portion by said ring member and remaining longitudinally stationary during axial movement of said ring member thereover, said sleeve member also having a deep, narrow annular external groove between said head portion and the forward end of said constrictable portion and a thin, flexible inwardly disposed longitudinally extending connecting portion at the bottom of the groove joining said head portion and said constrictable portion, the interior of said near end of said sleeve being counterbored to a depth substantially greater than the axial spacing of said external groove from said near end of said sleeve, the bottom of the counterbore in said sleeve defining a shoulder disposed to indent the external surface of the tube when the sleeve is constricted on the tube, a nut threadably engaging said body and having a bore through which the tube extends and having an internal shoulder engaging the end of said ring member remote from said body and adapted to advance said ring member toward said body over and relative to said tube and said constrictable portion of said sleeve to constrict the latter, said ring member having a steeper taper than said constrictable portion and having a mean internal diameter not substantially greater than the mean external diameter of said constrictable portion, said ring member when advanced by said nut progressively constricting said constrictable portion throughout the length thereof with maximum constriction near the end of said ring member remote from said body, said flexible portion yielding radially in response to constriction of said constrictable portion, said ring member bottoming longitudinally against said shoulder of said rigid portion, the seat on said body coacting with the seat on said rigid portion and inducing limited constriction of said rigid portion upon said tube of lesser amount than the constriction of said constrictable sleeve portion to facilitate substantially fluid-tight engagement of said seats.

8. In a tube coupling the combination of a solid continuous tube-encompassing sleeve member having an elongated constrictable portion with an external surface uniformly tapered throughout the entire length of said portion and being adapted to be constricted upon the tube to be coupled, a substantially non-expansible ring member having a uniformly tapered internal surface and being axially movable over said portion to constrict the same, a body having a tube receiving counterbore and a conical steeply pitched inwardly sloping seat juxtaposed to the near end of said sleeve member, the end of the tube bottoming in the counterbore of said body, said sleeve member having a short substantially rigid annular portion at said near end with a complementary seat juxtaposed to the seat of said body and with a shoulder facing oppositely of said seat, said sleeve member also having a radially flexible portion spacing and joining said head portion and said constrictable portion, the interior of said near end of said sleeve being counterbored to a depth substantially greater than the axial spacing of said external groove from said near end of said sleeve, the bottom of the counterbore in said sleeve defining a shoulder disposed to indent the external surface of the tube when the sleeve is constricted on the tube, said constrictable portion being engaged by and initially making line contact with the internal surface of said ring member and thereafter as said ring member is advanced by said nut toward said body being engaged and constricted by progressively more area of the internal surface of said ring member whereby said portion is progressively constricted throughout the length thereof with maximum constriction at said far end of said ring member, said flexible portion yielding radially in response to constriction of said constrictable portion, said ring member bottoming longitudinally against said shoulder of said rigid portion, the parts of the tube and the sleeve circumscribed by said bottomed ring member being constricted a greater amount under the far end of the ring than under the near end of the ring whereby the sleeve wedge grips the tube, the seat on said body coacting with the seat on said rigid portion and inducing limited constriction of said rigid portion upon said tube of lesser amount than the constriction of said constrictable sleeve portion to facilitate substantially fluid-tight engagement of said seats.

ARTHUR L. BIGELOW.

References Cited in the file of this patent

UNITED STATES PATENTS

| Number | Name | Date |
|---|---|---|
| 1,989,674 | Boas | Feb. 5, 1935 |
| 2,082,054 | Herzmark | June 1, 1937 |
| 2,211,856 | Kreidel | Aug. 20, 1940 |
| 2,287,889 | Krumsiek et al. | June 30, 1942 |
| 2,412,664 | Wolfram et al. | Dec. 17, 1946 |
| 2,463,707 | Matousek | Mar. 8, 1949 |
| 2,480,496 | Mercier | Aug. 30, 1949 |
| 2,508,763 | Mercier | May 23, 1950 |
| 2,536,745 | Herold | Jan. 2, 1951 |
| 2,547,889 | Richardson | Apr. 3, 1951 |

FOREIGN PATENTS

| Number | Country | Date |
|---|---|---|
| 576,862 | England | May 16, 1944 |